Feb. 12, 1952 F. H. CONDON 2,585,300
WASHING MACHINE TRANSMISSION
Filed April 29, 1948 4 Sheets-Sheet 1
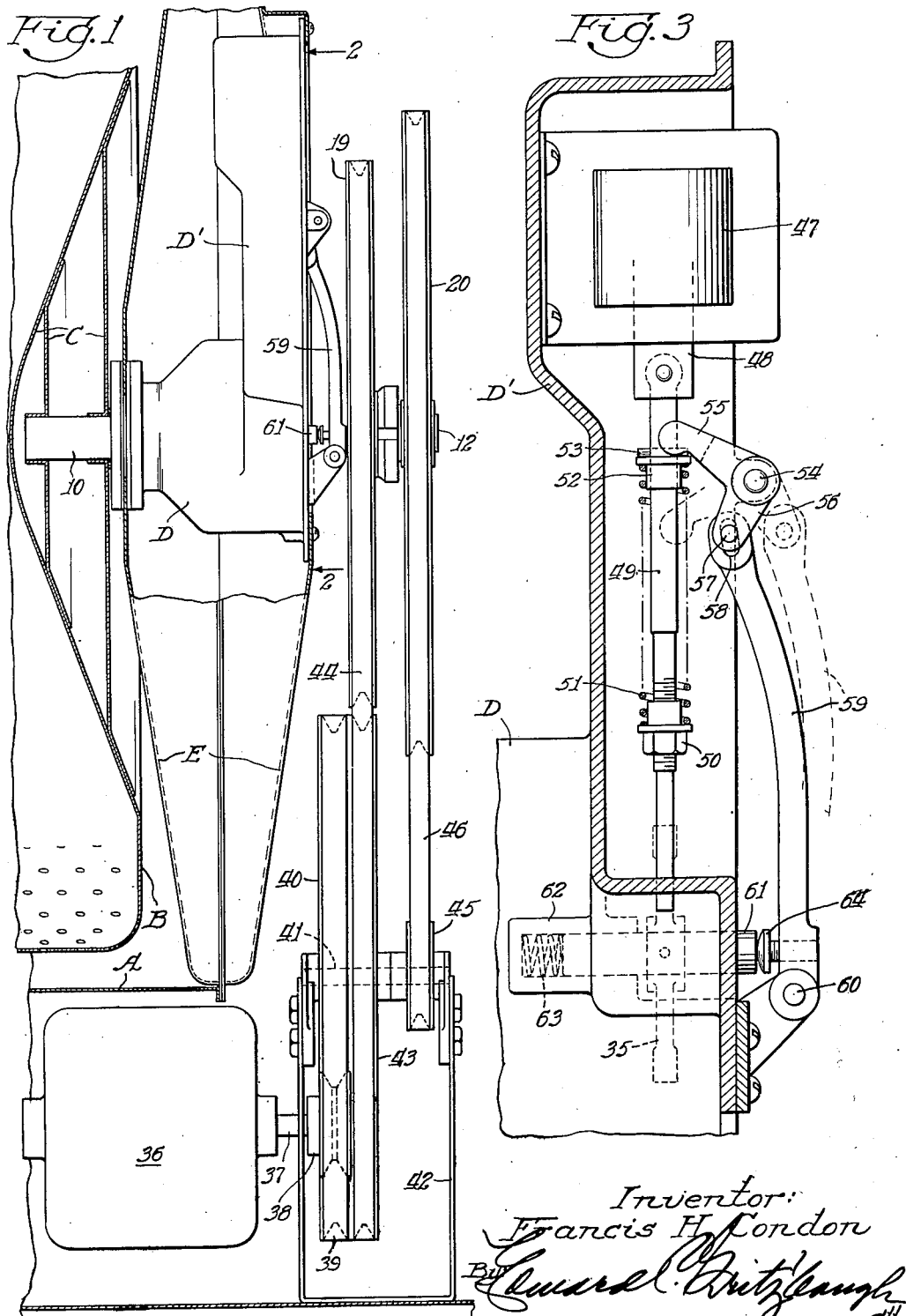

Feb. 12, 1952     F. H. CONDON     2,585,300
WASHING MACHINE TRANSMISSION
Filed April 29, 1948     4 Sheets-Sheet 2
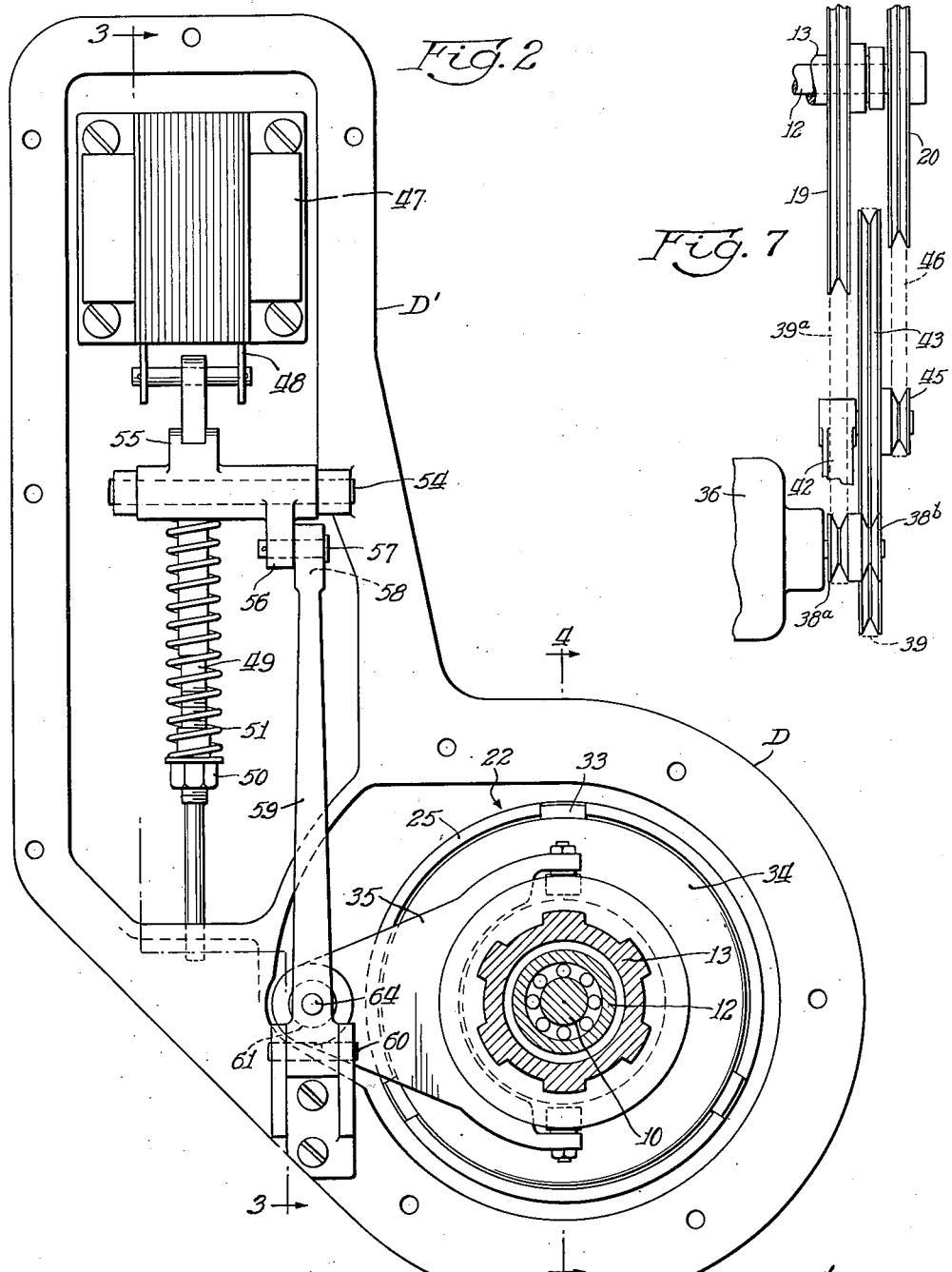
Inventor:
Francis H. Condon

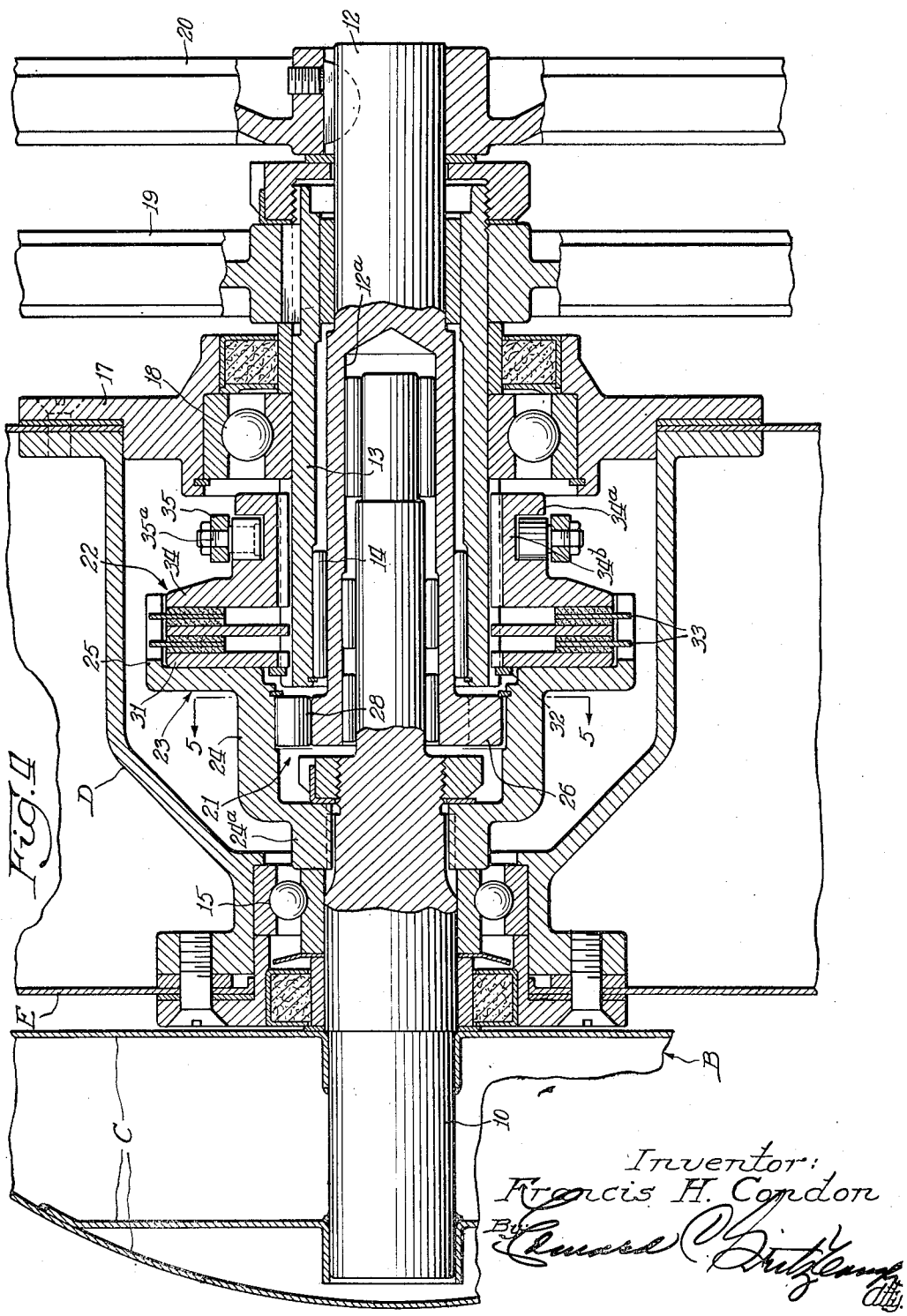

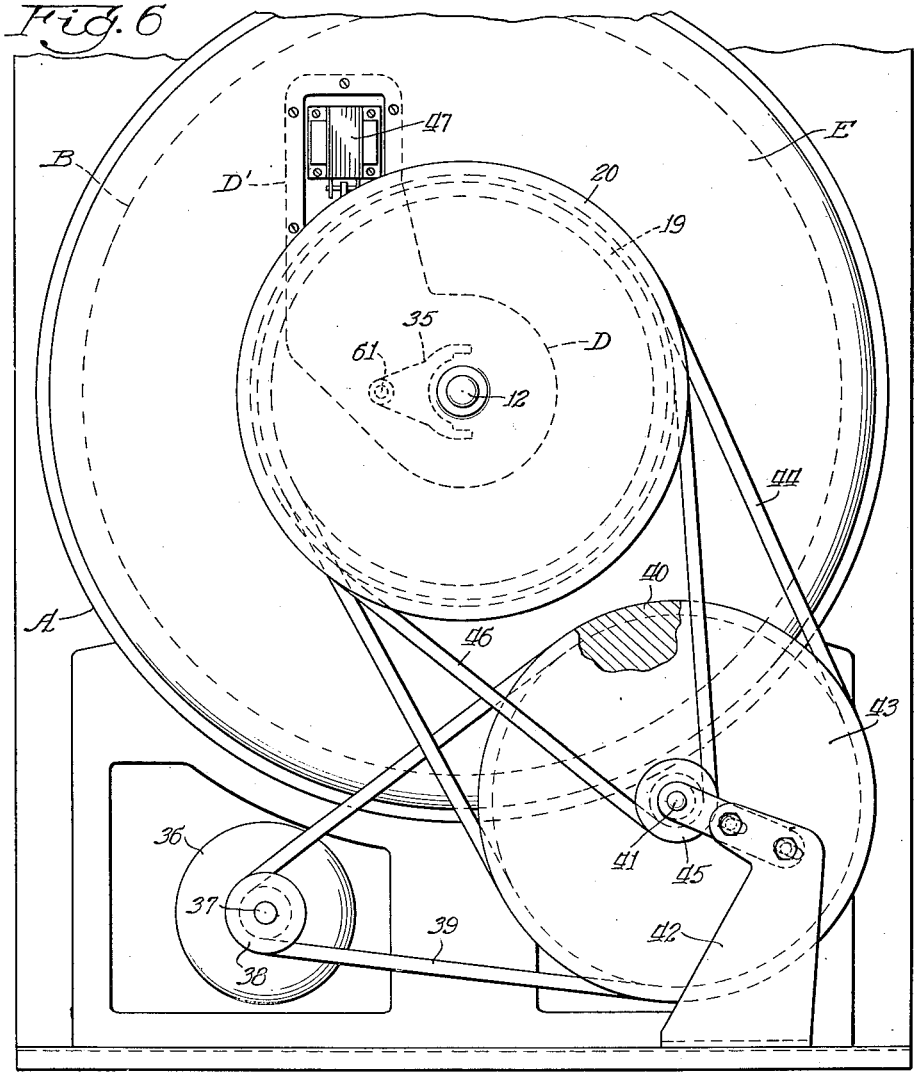

Patented Feb. 12, 1952

2,585,300

UNITED STATES PATENT OFFICE 2,585,300

WASHING MACHINE TRANSMISSION

Francis H. Condon, Detroit, Mich., assignor to Borg-Warner Corporation, Chicago, Ill., a corporation of Illinois Application April 29, 1948, Serial No. 23,918

8 Claims. (Cl. 74—217)

This invention relates to transmissions of the multiple-speed type. The present transmission is especially adapted for driving an automatic washing machine or the like, which washing machine is driven at different speeds during the cycle of operation, namely, first at a low speed during the washing period and then the driving is automatically changed to an accelerated speed during the period the washed articles are dried by centrifugal action.

It is one of the principal objects of this invention to simplify the construction of a multiple speed transmission assembly for automatic washing machines such as contemplated herein, and to improve the efficiency and operation of such transmission.

Another object hereof is to provide a transmission which is capable of imparting at least a low speed and a high to the washing machine, such speeds being produced through the medium of a first drive shaft and a second drive shaft, both of which, for the purpose of compactness, are preferably aligned with a driven shaft which has a washing machine tub thereon. In the present arrangement these two driving shafts are preferably mounted in telescoped relation to each other, thus effecting additional compactness, and such shafts are respectively connected by means of separate clutch assemblies, with the driven shaft on which the washing machine is mounted. It will be understood, of course, that one driving shaft will be idle or inactive during the driving operation of the other shaft.

A further object of the present improvements resides in the provision of a two-speed transmission wherein the driven shaft which has the basket thereon, is operatively connected to the prime mover through two torque paths which include separate belt drive assemblies for rotating telescoped driving shafts, which in turn are selectively coupled to said driven shaft respectively through a one-way clutch and a friction clutch.

Still another object of the present invention resides in the provision of a selective two-speed transmission assembly which operates entirely without the use of gears, pinions, and the like, thereby eliminating the whirring noises which are incident to the meshing of gears and pinions.

Additional objects, aims, and advantages of the improvements contemplated herein will be apparent to persons skilled in the art after the construction and operation of the transmission assembly is understood from the within description.

It is preferred to accomplish the numerous objects hereof and to practice the invention in substantially the manner hereinafter fully described and as more particularly pointed out in the appended claims. Reference is now made to the accompanying drawings forming a part of this specification.

In the drawings:

Figure 1 is a fragmentary view, partly in section, of portions of the washing machine and the transmission;

Figure 2 is a vertical section, taken along the plane of line 2—2 on Figure 1, showing details of the control means for effecting a change of speed of the driven shaft in the transmission;

Figure 3 is a vertical elevation of the control means viewed along the plane of line 3—3 on Figure 2;

Figure 4 is a vertical axial section of the two-speed transmission taken along the plane of line 4—4 on Figure 2;

Figure 5 is a trans-axial section of the over-running or one-way clutch, the view being taken along the plane of line 5—5 on Figure 4;

Figure 6 is a front view of the belt drive assemblies; and

Figure 7 shows modified belt drive assemblies.

The drawings are to be understood as being more or less of a diagrammatic character for the purpose of disclosing a typical or preferred form of the invention contemplated herein, and in these drawings like reference characters identify the same parts in the different views.

Having reference first to Figure 1, the washer may comprise a generally cylindrical imperforate tub member A, for holding the liquid and having therein a reticulated cylindrical drum or basket B, for holding the articles being laundered, both the tub and the basket being arranged on a common horizontal axis. Basket B which is adapted to receive the batch of articles to be washed or cleaned, is rotated at one predetermined speed during the cycle of operation in the liquid contained in the tub A during the washing or cleaning stage, and after the liquid has been removed from the tub the basket is rapidly rotated at an accelerated speed during the wringing or drying stage.

The basket has the rotatable driven shaft 10 of the transmission secured to its imperforate rear wall structure C, said shaft being journaled in a suitable change-speed housing D which extends axially between and is secured to the spaced members of the back wall structure E of the tub member A. It will be understood that the tub member A, which is immobile, is securely anchored within a suitably shaped cabinet (not shown) which also encloses the mechanism for operatively connecting a source of power to the change-speed mechanism.

As shown in Figure 4, the driven shaft 10 has a tub thereon which is identified generally as B, and said shaft is adapted to be driven at high and low speeds to effect the cycle of operation of the tub during washing and drying of the articles being laundered. Aligned with the basket shaft 10 are the first drive shaft 12 and the second drive shaft 13. These two drive shafts constitute respectively the low-speed drive shaft 12 and the high-speed drive shaft 13, and in the arrangement shown, the high-speed shaft 13 is of hollow or tubular construction so that it is telescoped over the low-speed shaft 12 with suitable needle or other anti-friction bearings 14 therebetween. Intermediate its ends the driven basket shaft 10 is journaled in a ball-bearing unit 15 secured within the hollow housing D, and the ends of shaft 10 project both outside and inside of this housing. There is an end plate 17 closing the large open end of housing D, said plate being secured to the end flange of the housing and the adjacent section of the tub end wall as shown in Figure 4. The high-speed driving shaft 13 extends into the housing D through this end plate 17 and is journaled in a ball-bearing unit 18 suitably anchored in said end plate.

The end portion of high-speed driving shaft 13 which projects outside the end plate 17 has a suitable pulley 19 anchored to it, and the outer end portion of low-speed driving shaft 12 protrudes beyond the outer end of high-speed drive shaft 13 where it has a pulley 20 secured to it. The driving connection between low-speed shaft 12 and driven basket shaft 10 preferably takes the form of a one-way over-running clutch assembly indicated generally at 21 while the driving connection between the high-speed shaft 13 and said driven shaft 10 is preferably effected through a friction clutch indicated generally at 22.

Adjacent the ball-bearing 15 the driven basket shaft 10 has a hollow clutch housing 23 secured to it, said housing comprising an elongated tubular region formed with a hub 24a, which is splined on shaft 10, and there is a wider cylindrical portion 25 extending outwardly from the hub. The inner end region of low-speed shaft 12 is axially bored as at 12a to receive the reduced end region 10a of the driven shaft 10. At the telescoped inner end of low-speed drive shaft 12 there is a radial boss 26 which is provided with one or more recesses 27 (Figure 5) to receive the one-way clutch rollers 28 which are adapted, when the clutch is engaged, to effect a wedging engagement with the tubular region 24 of clutch housing 23. Suitable springs 29, which are seated in pockets 30, urge the rollers into their clutch engaging positions when low speed shaft 12 is operative to drive the basket B. By reason of this arrangement the low-speed drive shaft 12 is adapted to rotate the driven shaft 10 at the speed required during the washing operation and will overrun when the high-speed mechanism is operating.

The friction clutch assembly 22, which drivingly connects the high-speed drive shaft 13 to the driven basket shaft 10, is enclosed within the cylindrical larger portion 25 of the clutch housing 23. This friction clutch assembly comprises a back plate or abutment member 31 held in place by a retainer ring 32 and is located adjacent the radial wall of the housing D which connects the tubular region 24 and the cylindrical portion 25. A plurality of disc-like or annular friction clutch members 33 are alternately splined respectively to the cylindrical housing portion 25 and the adjacent end region of high-speed shaft 13. There is a pressure member or plate 34, of angular or L-shape section, which is also splined to high-speed shaft 13 and adapted for movement toward and from the side of the friction members which is opposite the back plate 31. This pressure plate is moved at the proper time by a swinging shifter fork or yoke 35 to effect engagement of the friction clutch, whereby the high-speed drive shaft 13 will be rotated with the housing 23 which in turn actuates driven shaft 10 at the rate of speed required for the drying operation. During this portion of the operating cycle the one-way clutch assembly 21 will overrun and low-speed shaft 12 is disconnected from the driven tub shaft 10. As seen in Figure 4 the terminals 35a of the fork operate in an annular channel 34a formed in the outer surface of pressure plate flange 34b.

The source of power, or prime mover, for rotating drive shafts 12 and 13 may comprise an electric motor 36, the shaft 37 of which carries a small pulley 38 which transmits drive through two torque paths to the drive shafts 12 and 13. A belt 39 connects pulley 38 to a large pulley 40 on a countershaft 41 which is journaled in a bracket 42, and pulley 40 has a twin 43 preferably integral therewith which is connected by a belt 44 to the high-speed pulley 19 on drive shaft 13. A small pulley 45 on countershaft 41 is connected by a belt 46 to the low-speed pulley 20 on low-speed drive shaft 12. Figure 7 shows a high speed drive comprising twin motor pulleys 38a and 38b, with a belt 39a reeved on pulley 38a and extending directly to high speed pulley 19. Low speed drive is effected through pulley 38b, belt 39, large pulley 43, small pulley 45, belt 46, and large pulley 20 on low speed shaft 12. The motor 36 rotates at a constant speed and, by means of the belt drive assemblies, is adapted to drive the pulleys 19 and 20 at respectively fast and slow speeds.

An arrangement is provided which selectively controls the engagement and disengagement of friction clutch assembly 22, such control arrangement being adapted, at the proper time, to move the yoke 35 in a direction to force the pressure plate member 34 against the friction members 33 for effecting engagement of the friction clutch, thus coupling high-speed driving shaft 13 to the driven shaft 10. The arrangement for operating the fork 35 to cause it to move into different positions for effecting engagement and disengagement of the friction clutch may comprise a solenoid 47, the core 48 of which is coupled at one end to the proximate end of a reciprocable rod 49, the opposite end portion of said rod being guided in an aperture in the wall of an extension D¹ of transmission housing D. This rod 49 has an adjustable stop 50 for seating the lower end of a compressible spring 51, and the upper end of said spring engages a flanged collar 52 to yieldably urge said collar against a stop pin 53. A bell crank fulcrumed on a pivot 54 has its furcated arm 55 engaged with the flange on collar 52, and the other arm 56 of this bell crank has a trunnion 57 operating in a radial elongated slot 58 which is made transversely in the adjacent upper end of a clutch actuator arm 59. At its lower end arm 59 pivots on a pin 60. Adjacent the fulcrumed portion of arm 59, and located in the path of movement thereof, there is a retractable plunger 61 which, as shown in Figures 2 and 3, carries the shifter fork 35. The plunger 61 is reciprocably mounted in a hollow guide boss 62 and is backed by a compression spring 63 which urges said plunger outwardly against a bolt 64 that is adjustably carried by arm 59 in alignment with said plunger as shown in Figure 3. This renders the friction clutch assembly 23 effective to drive the basket shaft 10 at a high speed and overrun the one-way clutch assembly 21.

Thus, it will be seen that when the solenoid 47 has been energized, the bell crank will be rocked in a direction to move the clutch operating arm 59 thereby to reciprocate the shifter plunger 61 and fork 35 and thus move the friction clutch pressure plate 34 in a direction to cause the engagement of friction clutch assembly 23. It will be understood that the electric circuit which energizes the solenoid 47 is controlled by a suitable timing switch (not shown) which is manually set by the operator when the washing machine is started in operation.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

What is claimed is:

1. In a variable speed transmission having a housing and comprising three co-axially arranged shafts, two of said shafts being telescoped and constituting high and low speed driving shafts, and the third shaft being piloted on the inner portions of said telescoped shafts and constituting a driven shaft rotatable of high and low speeds by the respect in driving shafts, separate coupling means effective to alternately drivingly connect said driven shaft to the respective driving shafts, in combination with motor means including means to effect different speed ratios operatively connecting said motor means to the respective driving shafts, and means selectively operable for controlling at least one of said coupling means whereby said driven shaft is adapted to be alternately rotated at different speeds.

2. In a variable speed transmission for washing machines having a rotatable driven shaft adapted to be driven at high and low speeds, and having a first drive shaft and a second drive shaft, including constant speed motor means and separate driving connections between said motor means and said first and second drive shafts, said separate connections being adapted to rotate the respective drive shafts at different speeds, the combination of an overrunning clutch operatively connecting said first drive shaft to said driven shaft, friction coupling means operatively connecting said second drive shaft to said driven shaft, and means selectively operable for controlling the operation of said friction coupling means.

3. In a variable speed transmission for washing machines comprising a driven shaft adapted for operation of high and low speeds; a first driving shaft piloted thereon; a second driving shaft telescoped on said first driving shaft, said first and second driving shafts being rotatable at different speeds; motor means for actuating said driving shafts independently of each other; an overrunning clutch connection between said first driving shaft and said driven shaft; a friction clutch connection between said second driving shaft and said driven shaft; and means selectively operable for controlling the engagement and disengagement of said friction clutch.

4. In a variable speed transmission for washing machines comprising a driven shaft; a first driving shaft piloted thereon; a second driving shaft telescoped on said first driving shaft; motor means for actuating said driving shafts independently of each other; a rotatable clutch housing carried by said driven shaft; an overrunning clutch connection between said first driving shaft and said clutch housing; a friction clutch connection between said second driving shaft and said clutch housing; and means selectively operable for controlling the engagement and disengagement of said friction clutch, said control means comprising linkage members operable in response to energization of a solenoid for effecting friction clutch engagement and disengagement.

5. In a variable speed transmission for washing machines comprising a driven shaft; a first driving shaft piloted thereon; a second driving shaft telescoped on said first driving shaft; motor means for actuating said driving shafts independently of each other; a rotatable clutch housing carried by said driven shaft; an overrunning clutch connection between said first driving shaft and said clutch housing; friction clutch plates carried respectively by said second driving shaft and said clutch housing; an axially shiftable pressure plate carried by said second driving shaft alongside said friction clutch plates; and means selectively operable for moving said pressure plate into engagement with and disengagement from said friction clutch plates, said means comprising linkage members operable in response to energizing a solenoid for effecting friction clutch engagement and disengagement.

6. In a variable speed transmission having a rotatable driven shaft arranged to be driven at high and low speeds, and having a first drive shaft and a second drive shaft piloted one within the other and both being co-axially aligned with said driven shaft, including constant speed motor means and separate driving connections between said motor means and said first and second drive shafts, said separate connections being arranged to rotate the respective drive shafts at different speeds, the combination of an overrunning clutch connection operatively disposed between said drive shaft and said driven shaft, and friction coupling means arranged to connect said second drive shaft and said driven shaft, and mechanical means selectively operable for coupling the operation of said friction coupling, said mechanical means comprising linkage members interconnected with a solenoid and operable responsive to energization of said solenoid for effecting friction coupling engagement and disengagement.

7. In a variable speed transmission for washing machines comprising a driven shaft adapted for operation at high and low speeds; a first driving shaft piloted thereon; a second driving shaft telescoped on said first driving shaft, said first and second driving shafts being rotatable at different speeds; motor means for actuating said driving shafts independently of each other; an overrunning clutch connection between said first driving shaft and said driven shaft; a friction clutch connection between said second driving shaft and said driven shaft; and means comprising linkage members interconnected between said friction clutch connection and a solenoid and operable responsive to energization of said solenoid for effecting friction clutch engagement and disengagement.

8. A two speed driving mechanism for a washing machine comprising three coaxially arranged shafts, two of said shafts being telescoped and constituting high and low speed driving shafts, and the third shaft being piloted on the inner portions of said telescoped shafts and constituting a driven shaft rotatable alternately at high and low speeds by the respective driving shafts, separate coupling means effective to alternately drivingly connect said driven shaft to the respective driving shafts, motor means including means to effect different speed ratios operatively connecting said motor means to the respective driving shafts, and means comprising linkage members reacting upon and for controlling at least one of said coupling means and actuated by a solenoid responsive to electric energization for effecting coupling control of the related coupling means.

FRANCIS H. CONDON.

REFERENCES CITED

The following references are of record in the file of this patent:

UNITED STATES PATENTS

| Number | Name | Date |
| --- | --- | --- |
| 1,190,285 | Gouldbourn | July 11, 1916 |
| 1,780,475 | Gold et al. | Nov. 4, 1930 |
| 2,136,811 | Burnett | Nov. 15, 1938 |
| 2,316,131 | Cardwell | Apr. 6, 1943 |
| 2,337,586 | Bowen | Dec. 28, 1943 |